United States Patent
Menda et al.

(10) Patent No.: US 10,188,991 B2
(45) Date of Patent: Jan. 29, 2019

(54) PERMSELECTIVE ASYMMETRIC MEMBRANES

(71) Applicant: GAMBRO LUNDIA AB, Lund (SE)

(72) Inventors: Ralf Menda, Senden (DE); Martin Rempfer, Gomaringen (DE); Joachim Loercher, Moessingen (DE)

(73) Assignee: GAMBRO LUNDIA AB, Lund (SE)

( * ) Notice: Subject to any disclaimer, the term of this patent is extended or adjusted under 35 U.S.C. 154(b) by 112 days.

(21) Appl. No.: 14/915,520

(22) PCT Filed: Sep. 3, 2014

(86) PCT No.: PCT/EP2014/068662
§ 371 (c)(1),
(2) Date: Feb. 29, 2016

(87) PCT Pub. No.: WO2015/032786
PCT Pub. Date: Mar. 12, 2015

(65) Prior Publication Data
US 2016/0207009 A1    Jul. 21, 2016

(30) Foreign Application Priority Data
Sep. 5, 2013 (EP) ..................... 13183112

(51) Int. Cl.
| | | |
|---|---|---|
| *B01D 71/28* | (2006.01) | |
| *B01D 67/00* | (2006.01) | |
| *B01D 69/08* | (2006.01) | |
| *B01D 71/68* | (2006.01) | |
| *B01D 69/06* | (2006.01) | |
| *B01D 63/02* | (2006.01) | |

(52) U.S. Cl.
CPC .......... *B01D 71/28* (2013.01); *B01D 67/0011* (2013.01); *B01D 69/06* (2013.01); *B01D 69/08* (2013.01); *B01D 71/68* (2013.01); *B01D 63/023* (2013.01); *B01D 2325/34* (2013.01)

(58) Field of Classification Search
CPC .............. B01D 2325/34; B01D 63/023; B01D 67/0011; B01D 69/06; B01D 69/08; B01D 71/28; B01D 71/68
See application file for complete search history.

(56) References Cited

U.S. PATENT DOCUMENTS

| | | |
|---|---|---|
| 2007/0062871 A1 | 3/2007 | Hahmann et al. |
| 2011/0031184 A1 | 2/2011 | Krause et al. |
| 2011/0226689 A1* | 9/2011 | Komori .............. B01D 67/0009 210/490 |

FOREIGN PATENT DOCUMENTS

| | | |
|---|---|---|
| EP | 0305687 | 3/1989 |
| EP | 0844015 | 5/1998 |
| EP | 1439212 | 7/2004 |
| EP | 1913964 | 4/2008 |
| EP | 2113298 | 11/2009 |
| EP | 2216060 | 8/2010 |
| EP | 2567750 | 3/2013 |
| WO | WO2001/060477 | 8/2001 |
| WO | WO2004/056459 | 7/2004 |
| WO | WO2004/056460 | 7/2004 |

OTHER PUBLICATIONS

PCT Search Report and Written Opinion for PCT/EP2014/068662, completed Nov. 14, 2014.
Watanabe, Nobuko, et al., "Urinary Protein as Measured with a Pyrogallol Red-Molybdate Complex, Manually and in a Hitachi 726 Automated Analyzer," 1986, Clin. Chem. vol. 32, No. 8, pp. 1551-1554.
Luvitec for Membrane Applications: BASF the Chemical Company; www.luvitec.com; XP002719015.

* cited by examiner

*Primary Examiner* — Dirk R Bass
(74) *Attorney, Agent, or Firm* — Barnes & Thornburg LLP

(57) ABSTRACT

The present invention relates to membranes being suitable e.g. for hemodialysis, hemodiafiltration, or hemofiltration of blood. The invention also relates to a process for the production of the membranes; and to devices comprising the membranes.

19 Claims, No Drawings

PERMSELECTIVE ASYMMETRIC MEMBRANES

CROSS-REFERENCE TO RELATED APPLICATIONS

This application is the U.S. national phase of PCT/EP2014/068662, filed on Sep. 3, 2014, which claims priority to European Patent Application 13183112.5, filed on Sep. 5, 2013. The disclosures of both European Patent Application 13183112.5 and PCT/EP2014/068662 are hereby incorporated herein by reference in their entireties.

TECHNICAL FIELD

The present invention relates to membranes being suitable e.g. for hemodialysis, hemodiafiltration, or hemofiltration of blood. The invention also relates to a process for the production of the membranes; and to devices comprising the membranes.

BACKGROUND OF THE INVENTION

Synthetic membranes for hemodialysis, hemodiafiltration, or hemofiltration of blood usually are comprised of a hydrophobic polymer which is blended with a hydrophilic polymer to improve compatibility of the membrane with blood. Often polysulfone, polyethersulfone, or polyarylethersulfone are used as hydrophobic polymer, and polyvinylpyrrolidone is used as hydrophilic polymer.

WO 2004/056459 A1 discloses a permselective asymmetric membrane suitable for hemodialysis, comprising at least one hydrophobic polymer, e.g. polyethersulfone, and at least one hydrophilic polymer, e.g. polyvinylpyrrolidone. The outer surface of the hollow fiber membrane has pores in the range of 0.5 to 3 μm and the number of pores in the outer surface is in the range of 10,000 to 150,000 pores per $mm^2$. The polyvinylpyrrolidone used to prepare the membrane in the working examples (PVP K30) has a weight average molecular weight of 50 kDa.

WO 2004/056460 A1 discloses a permselective asymmetric membrane suitable for hemodialysis, comprising at least one hydrophobic polymer, e.g. polyethersulfone, and at least one hydrophilic polymer, e.g. polyvinylpyrrolidone. The membrane allows passage of molecules having a molecular weight of up to 45 kDa in the presence of whole blood. The polyvinylpyrrolidone used to prepare the membrane in the working examples (PVP K30) has a weight average molecular weight of 50 kDa.

EP 2 113 298 A1 discloses a permselective asymmetric membrane suitable for hemodialysis, comprising 80-99 wt % of polyethersulfone and 1-20 wt % of polyvinylpyrrolidone, wherein the polyvinylpyrrolidone consists of a low molecular weight component having a molecular weight of below 100 kDa and a high molecular weight component having a molecular weight of 100 kDa or more. The spinning solution for preparing the membrane comprises between 12 and 15 wt % of polyethersulfone and 5 to 10 wt % of PVP consisting of a low and a high molecular PVP component.

EP 1 439 212 A1 discloses a hollow fiber membrane comprising polysulfone, polyvinylpyrrolidone and a cationic polymer. The polyvinylpyrrolidone preferably has a weight average molecular weight in the range of from 2,000 to 2,000,000 Da, more preferably 10,000 to 1,500,000 Da. Commercial products with a weight average molecular weight of 1,100,000, 45,000, 29,000, 9,000, or 29,000 have been used preferably. The polyvinylpyrrolidone content in the membrane preferably is in the range of 1 to 50 wt %, more preferably 1 to 10 wt %.

EP 1 913 964 A2 discloses a hollow fiber membrane type blood purification device comprising a bundle of hollow fiber membranes comprising a polysulfone resin and polyvinylpyrrolidone, wherein the hollow fiber membranes have an adhesion rate of a radical trapping agent of 80-300%, based on the dry weight of the hollow fiber membranes, and have a water content of not less than 40% and less than 100%, and have been sterilized with radiation. The molecular weight of the polyvinylpyrrolidone in the hollow fiber membrane is 10,000 to 2,000,000 Da, preferably 50,000 to 1,500,000 Da. The polyvinylpyrrolidone content in the membrane is 3 to 20%, preferably 3 to 10%, based on the total amount of the polymer.

EP 2 216 060 A1 discloses a porous hollow fiber membrane for treating blood having a membrane thickness of 25 μm to 40 μm, and providing fibrils having an average diameter of from 100 μm to 200 μm, wherein the ratio (To/Ti) of the average outside diameter (To) to the average inside diameter (Ti) is adjusted to not more than 2. The membrane comprises a polysulfone-based polymer and polyvinylpyrrolidone and has a gradient porous structure with an increase in pore size from the inside to the outside. The polyvinylpyrrolidone used preferably has a weight-average molecular weight of about 1,000,000 Da (PVP K80 to K90 grades). The PVP concentration in the membrane forming stock solution is adjusted so that the mixing ratio of PVP to polysulfone is 27 wt % or less, preferably 18 to 27 wt %, more preferably 20 to 27 wt %.

When polyvinylpyrrolidone having a relatively low molecular weight (like PVP K30) is used in the preparation of a membrane, a large amount of the polyvinylpyrrolidone initially present in the membrane is leached from the membrane during washing. On the other hand, membranes prepared using only polyvinylpyrrolidone having high molecular weight (like PVP K80 or K90) tend to show lower clearance of solutes like urea or vitamin B12 from blood and higher protein loss.

SUMMARY OF THE INVENTION

It is an object of the present invention to provide permselective asymmetric membranes suitable for, e.g., hemodialysis, hemodiafiltration and hemofiltration of blood.

According to one aspect of the invention, a permselective asymmetric membrane having improved performance is provided. In a particular embodiment, the membrane comprises polysulfone, polyethersulfone (PES), or polyarylethersulfone (PAES); and polyvinylpyrrolidone having a weight average molecular weight greater than 1,500 kDa and less than 2,000 kDa.

According to a further aspect, the invention relates to a process for preparing the permselective asymmetric membrane of the invention; and to devices comprising the membrane.

DETAILED DESCRIPTION

The permselective asymmetric membrane of the present invention is based on at least one polysulfone, polyethersulfone (PES), or polyarylethersulfone (PAES); and a polyvinylpyrrolidone (PVP). The polyvinylpyrrolidone has a weight average molecular weight of more than 1,500 kDa and less than 2,000 kDa.

It has been found that this particular high molecular weight PVP component allows for the production of membranes that show clearance rates for urea and vitamin B12 and protein loss values which are similar to those of membranes produced using a mixture of low molecular weight PVP (like PVP K30) and commonly used high molecular weight PVP (PVP K80 to K90 grades). As already mentioned, production of membranes with PVP K80 to K90 grades and without low molecular weight PVP usually results in lower clearance rates and higher protein loss. Surprisingly, this effect is not observed with the PVP component of the invention which has even higher molecular weight than commonly used PVP grades.

The membranes of the invention can be produced using smaller amounts of PVP, as much less PVP is leached from the membranes during the washing step. As the PVP present in the membrane-forming solution is almost completely retained in the membrane, less waste is produced during the production process, and less energy is required for reclaiming solvent from the process effluents.

The PVP comprised in the permselective asymmetric membrane has a weight average molecular weight Mw greater than 1,500 kDa and less than 2,000 kDa, preferably from 1,700 kDa to 1,900 kDa. In one embodiment, the number average molecular weight Mn of the PVP is in the range of from 340 to 390 kDa, preferably from 360 to 390 kDa. In one embodiment, the polydispersity Mw/Mn of the polyvinylpyrrolidone is in the range of from 4.5 to 5.4, preferably 4.6 to 5.0.

An example of a suitable polyethersulfone is a polymer having the general formula $-[O-Ph-SO_2-Ph-]_n-$, a weight average molecular weight of about 60,000 to 65,000 Da, preferably 63,000 to 65,000 Da, and a Mw/Mn of about 1.5 to 1.8.

In one embodiment, the membrane of the present invention comprises 70-99 wt % of polysulfone, polyethersulfone (PES), or polyarylethersulfone (PAES); and 1-30 wt % of polyvinylpyrrolidone (PVP).

In one embodiment, the membrane of the invention is a flat sheet membrane. In another embodiment, the membrane of the invention is a hollow fiber membrane. In a particular embodiment, the hollow fiber membrane has a four-layer structure.

The inner layer of the four-layer structure, i.e. the blood contacting layer and the inner surface of the hollow fiber membrane, is a separation layer having a pore size in the nano-scale range. In one embodiment, this layer has a thickness of less than 1 µm. In order to achieve high selectivity, the pore channels within the layer are short, i.e. below 0.1 µm, and the pore channel diameter shows a low variation in size.

The second layer in the hollow fiber membrane, which serves as a support for the first layer, has a sponge structure. In one embodiment of the present invention, this layer has a thickness of about 1 to 15 µm.

The third layer has a finger structure. It provides for mechanical stability on the one hand; on the other hand, due to the high void volume, it has a very low resistance of transport of molecules through the membrane when the voids are filled with water. The third layer has, in one embodiment of the present invention, a thickness of 10 to 60 µm.

The fourth layer in this embodiment of the present invention is the outer layer, which is characterized by a defined surface structure with open pores. In one embodiment, the number average size of the pore openings is in the range of 0.5-3 µm, further the number of pores on the outer surface is in the range of 10,000 to 150,000 pores per $mm^2$, for example in the range of 18,000 to 100,000 pores per $mm^2$, or even in the range of 20,000 to 100,000 pores per $mm^2$. In one embodiment, this fourth layer has a thickness of about 1 to 10 µm.

The membrane of the invention can be produced by a solvent phase inversion process. A suitable process for the production of flat sheet membranes comprises the following steps:

a) dissolving at least one polysulfone, polyethersulfone (PES), or polyarylethersulfone (PAES) and a polyvinylpyrrolidone (PVP) having a weight average molecular weight Mw of more than 1,500 kDa and less than 2,000 kDa in at least one solvent to form a homogeneous casting solution;

b) conditioning the homogeneous casting solution to a molding temperature;

c) pouring the homogeneous casting solution onto a carrier to form a film;

d) introducing the film located on the carrier into a coagulation medium and initiating the coagulation of the film for the formation of a membrane structure;

e) withdrawing the membrane structure from the carrier within the coagulation medium by means of withdrawal device;

f) extracting the resulting membrane and subsequently drying the membrane.

The pouring of the casting solution to form a film can take place according to methods known per se, for example by means of conventional forming tools like sheeting dies, casting molds, or doctor blades.

The pouring of the casting solution takes place on a carrier; here also, one can resort to the conventional carriers, from which the coagulated membrane can be withdrawn later. For example, coated papers or steel tapes can be used. Preferably, the carrier is a heating roll that can be temperature controlled, i.e. a casting roller, onto which the film is poured.

The film located on the carrier is introduced into a coagulation medium and coagulation for the formation of the membrane structure is initiated. In one embodiment of the method, the coagulation medium is water. In the coagulation medium, the film is initially precipitated to form the membrane structure to the extent that the membrane structure already has a sufficient stability and can be withdrawn from the carrier, i.e. preferably from the casting roller. The withdrawal from the casting roller occurs by means of a withdrawal device, for example by means of a drawing-off roller.

Following the withdrawal device, the coagulation is completed in the subsequent coagulation baths and the membrane is stabilized. These coagulation baths can have a higher temperature in comparison to the first, previously described coagulation bath. The temperature can also be increased stepwise from bath to bath. In the coagulation baths thereby simultaneously occurs an extraction of the solvent system from the membrane structure, so that the coagulation baths function simultaneously as wash or extraction baths. As a coagulation or wash medium in these coagulation or wash baths, water is preferably used.

After the extraction, the resulting membrane is dried, for example, by means of a drum dryer, and the dried membrane is thereafter wound up. The dried membrane may subsequently be sterilized. In one embodiment of the process, the membrane is steam-sterilized at temperatures of at least 121° C. for at least 21 minutes.

Hollow fiber membranes of the invention can be produced by a solvent phase inversion spinning process, comprising the steps of a) dissolving at least one polysulfone, polyethersulfone (PES), or polyarylethersulfone (PAES) and a polyvinylpyrrolidone (PVP) in at least one solvent to form a polymer solution;
b) extruding the polymer solution through an outer ring slit of a nozzle with two concentric openings into a precipitation bath; simultaneously
c) extruding a center fluid through the inner opening of the nozzle;
d) washing the membrane obtained;
e) drying the membrane;
f) and, optionally, sterilizing said membrane e.g. by treatment with steam, ethylene oxide or radiation, characterized in that the polyvinylpyrrolidone has a weight average molecular weight Mw of more than 1,500 kDa and less than 2,000 kDa.

In one embodiment, the spinning solution for preparing a membrane according to the present invention comprises from 12 to 16 wt %, e.g., 13 to 15 wt %, relative to the total weight of the polymer solution, of polyethersulfone and from 1.5 to 5 wt %, e.g., 3 to 4 wt %, relative to the total weight of the polymer solution, of PVP.

In a particular embodiment, the polymer solution used in the process for preparing the membrane of the present invention further comprises 66-81 wt % of solvent, relative to the total weight of the solution, and 0-10 wt %, e.g. 0-5 wt %, relative to the total weight of the solution, of suitable additives. Suitable additives are, for example, chosen form the group consisting of water, glycerol, and other alcohols. In one embodiment, water is present in the spinning solution in an amount of from 1 to 7 wt %, e.g., in an amount of from 2 to 6 wt %, for instance, 3 to 5 wt %, relative to the total weight of the solution. In one embodiment, the solvent used in the process is chosen from the group consisting of N-methyl2-pyrrolidone (NMP), N-ethyl-2-pyrrolidone, N-octyl-2-pyrrolidone, dimethylacetamide (DMAC), dimethylsulfoxide (DMSO), dimethylformamide (DMF), butyrolactone, and mixtures of said solvents. In a particular embodiment, NMP is used as the solvent.

The center fluid or bore liquid which is used for preparing the membrane according to the invention comprises at least one of the above-mentioned solvents and a precipitation medium chosen from the group of water, glycerol and other alcohols.

The center fluid generally comprises 40-100 wt % precipitation medium and 0-60 wt % of solvent. In one embodiment the center fluid comprises 45-65 wt % precipitation medium and 35-55 wt % of solvent. In a particular embodiment, the center fluid comprises 50-60 wt % of water and 40-50 wt % of NMP. In another embodiment, the center fluid comprises 54-56 wt % of water and 44-46 wt % of NMP.

In one embodiment of the process, the polymer solution coming out through the outer slit opening of the spinneret is guided through a spinning shaft with controlled atmosphere. In one embodiment of the process, the spinning shaft is held at a temperature within the range of from 2 to 90° C., e.g., within the range of from 25 to 70° C., or from 30 to 60° C.

In one embodiment, the precipitating fiber is exposed to a humid steam/air mixture comprising a solvent in a content of from 0 to 10 wt %, for instance, from 0 to 5 wt %, or from 0 to 3 wt %, relative to the water content. The temperature of the humid steam/air mixture is at least 15° C., preferably at least 30° C., and at most 75° C., e.g. not higher than 62° C. Further, the relative humidity in the humid steam/air mixture is from 60 to 100%.

The effect of the solvent in the temperature-controlled steam atmosphere is to control the speed of precipitation of the fibers. When less solvent is employed, the outer surface will obtain a denser surface, and when more solvent is used, the outer surface will have a more open structure. By controlling the amount of solvent within the temperature-controlled steam atmosphere surrounding the precipitating membrane, the amount and size of the pores on the outer surface of the membrane can be modified and controlled.

In one embodiment of the invention, the precipitation bath comprises from 85 to 100 wt % of water and from 0 to 15 wt % of solvent, e.g., NMP. In another embodiment, the precipitation bath comprises from 90 to 100 wt % water and from 0 to 10 wt % NMP. In still another embodiment, the precipitation bath only comprises water. Usually, the precipitation bath has a temperature in the range of from 10 to 80° C.

In one embodiment of the process for preparing the membrane of the present invention, the temperature of the spinneret is 50-60° C., e.g., 54-58° C., the temperature of the spinning shaft is 25-65° C., for instance, 50-60° C. The distance between the opening of the nozzle and the precipitation bath is from 30 to 110 cm. The precipitation bath has a temperature of 20-40° C. In one embodiment, the spinning velocity, i.e., the speed at which the membrane is withdrawn from the precipitation bath, is in the range of 15-100 m/min, for instance, 35-55 m/min.

The membrane will then be washed to remove waste components. In one embodiment of the process, the membrane is passed through at least one water bath at a temperature in the range of from 70 to 90° C. In another embodiment, the membrane is passed through two water baths. In still another embodiment, the membrane is passed through five water baths. In certain embodiments of the process, the individual water baths have different temperatures. For instance, each water bath may have a higher temperature than the preceding water bath.

After washing, the membrane is dried and subsequently may be sterilized. In one embodiment of the process, the membrane is steam-sterilized at temperatures of at least 121° C. for at least 21 minutes.

In one embodiment, the hollow fiber membrane of the invention has an inner diameter of from 180 to 250 µm. In one embodiment, the inner diameter is 185 to 195 µm.

The wall thickness of the hollow fiber generally is in the range of from 10 to 55 µm. In one embodiment, the wall thickness is 33 to 37 µm.

Another aspect of the invention is a diffusion and/or filtration device comprising the membrane of the invention. Examples of such devices are dialyzers, hemofilters, and ultrafilters. Such devices generally consist of a casing comprising a tubular section with end caps capping the mouths of the tubular section. A bundle of hollow fiber membranes is usually arranged in the casing in a way that a seal is provided between the first flow space formed by the fiber cavities and a second flow space surrounding the membranes on the outside. Examples of such devices are disclosed in EP 0 844 015 A2, EP 0 305 687 A1, and WO 01/60477 A2, all incorporated herein by reference.

Another aspect of the invention is the use of the membrane of the invention in hemodialysis, hemodiafiltration or hemofiltration of blood. The membrane of the invention can be used for these purposes instead of conventional membranes, but in a similar manner. The person skilled in the art will easily derive the necessary modus operandi.

Another aspect of the invention is the use of the membrane of the invention in bioprocessing, plasma fractionation and the preparation of protein solutions. The membrane of the invention can be used for these purposes instead of membranes conventionally used for these purposes. The person skilled in the art will easily derive a suitable modus operandi for the intended application.

It will be understood that the features mentioned above and those described hereinafter can be used not only in the combination specified but also in other combinations or on their own, without departing from the scope of the present invention.

The present invention will now be described in more detail in the examples below. The examples are not intended to limit the scope of the present invention, but are merely an illustration of particular embodiments of the invention.

EXAMPLES i) Preparation of Filters

Two types of filters (=dialyzer) were used in the examples. The first type of filter comprises about 12,000 fibers with an effective surface area of about 1.7 m², the second type of filter comprises about 17,000 fibers with an effective surface area of about 2.72 m². The effective surface A is calculated according to equation (1)

$$A = \pi \cdot d_i \cdot l \cdot n \text{ [cm}^2\text{]} \quad (1)$$

with
$d_i$=inner diameter of fiber [cm]
n=amount of fibers
l=effective fiber length [cm]

A filter has a cylindrical housing with two connectors for the dialyzing fluid and caps applied on both ends, each with one centered blood connector. The manufacturing process (after winding of the fibers) comprises the following main steps:

⇨ a fiber bundle (length approx. 30 cm) is transferred into the housing;
⇨ both ends of the fibers in the bundle are closed by a closing process
⇨ the fibers are potted into the housing with polyurethane (PUR);
⇨ the ends of the potted bundles are cut to open the fibers;
⇨ the caps are welded to the blood connectors using ultrasonic welding;
⇨ final treatment comprises rinsing, integrity testing, final drying;
⇨ the filters are packed in sterile bags and steam sterilized.

Analytical Methods ii) Hydraulic Permeability (Lp)

The hydraulic permeability was determined by measuring the trans-membrane pressure observed in dead-end filtration of normal saline (0.9% w/v NaCl) through the filter at a predefined flow rate $Q_B$ of 500 ml/min. The hydraulic permeability can be calculated from the effective membrane surface area A, the trans-membrane pressure TMP, and the flow rate $Q_B$, according to equation (2):

$$Lp = Q_B / [TMP \cdot A] \quad (2)$$

iii) Sieving Coefficient (SC)

Sieving coefficients of albumin (MW=66 kDa) and myoglobin (MW=17 kDa), respectively, in aqueous solution were determined following EN 1283:1996. Instead of plasma, solutions of the respective proteins in PBS buffer having a pH of 7.2 were used for the testing procedure. The myoglobin solution contained 0.1 g/l myoglobin; the albumin solution contained 0.2 g/l albumin. The sieving coefficient of the particular molecule was obtained as follows: The particular protein solution was maintained at a temperature of 37° C.±1° C. and pumped through the filter at a defined flow rate $Q_B$ and ultrafiltration rate UF. For filters having an effective surface area of 1.7 m², $Q_B$ was set to 289 ml/min and UF to 72 ml/min. For filters having an effective surface area of 1.7 m², $Q_B$ was set to 372 ml/min and UF to 115 ml/min. Then, the concentration of the protein in the feed (in), in the retentate (r) and in the filtrate (f) was determined by the biuret method and the sieving coefficient (SC) was calculated according to the following equation (3):

$$SC \text{ [\%]} = 2 \cdot c(f) / [c(in) + c(r)] \cdot 100\% \quad (3)$$

If the concentration of the protein in the filtrate is zero, a sieving coefficient of 0% is obtained. If the concentration of the protein in the filtrate equals the concentration of the protein in the feed and the retentate, a sieving coefficient of 100% is obtained.

iv) Clearance Rate of Urea and Vitamin B12

Clearance rates of urea (C(urea)) and vitamin B12 (C(vitamin B12)), respectively, were determined following EN 1283:1996, at $Q_D$=500 ml/min, $Q_B$=400 ml/min, UF=0. Clearance rate of urea was determined using a solution of 1 g/l urea in acetate dialysis liquid. Clearance rate of vitamin B12 was determined using a solution of 0.04 g/l vitamin B12 in acetate dialysis liquid.

v) Ultrafiltration Rate and Protein Permeability

Ultrafiltration rate (UF) was determined according to EN 1283:1996, using bovine plasma having a protein content of 60±5 g/l at a temperature of 37° C. $Q_B$ and TMP were set as indicated below in the respective example.

For the measurement of protein permeability, a sample of the ultrafiltrate was taken after 25 min. Protein concentration (Pct) in the ultrafiltrate was determined photometrically at 600 nm using the pyrogallol red-molybdate method (Clinical Chemistry 32 (1986) 1551-1554).

Comparative Example 1

A polymer solution was prepared by dissolving polyethersulfone (Ultrason® E 6020, BASF SE) and polyvinylpyrrolidone (Luvitec® K30 and K85, BASF SE) and distilled water in N-methyl-2-pyrrolidone (NMP). The weight fraction of the different components in the polymer spinning solution was: PES:PVP K85:PVP K30:H₂O:NMP=14:2:5:3:76.

A center fluid was prepared by mixing distilled water and N-methyl-2-pyrrolidone (NMP) in a stainless steel container. The weight fraction of the two components in the center fluid was: H₂O:NMP=54.5 wt %:45.5 wt %. The clear mixture was filtered into a second stainless steel container and degassed at 50 mmHg.

A membrane was formed by heating the polymer solution to 50° C. and passing the solution as well as the center fluid through a spinning die. The temperature of the die was 56° C. and of the spinning shaft was 54° C. The hollow fiber membrane was formed at a spinning speed of 45 m/min. The liquid capillary leaving the die was passed into a water bath (ambient temperature). The distance between the die and the precipitation bath was 105 cm.

The hollow fiber membrane was washed by passing it through 5 different water baths. After leaving the fifth water bath, the fibers were fed to an online dryer and dried. The dry hollow fiber membrane had an inner diameter of 190 μm and an outer diameter of 260 μm and a fully asymmetric membrane structure.

The membranes were wound on a winding wheel and filters comprising 12132 fibers and having an effective surface area of 1.7 m² were prepared according to the method described above and steam-sterilized ((22±1) min, (121±1)° C.).

The performance of the filters was tested as described above. The results are shown in Table 1.

TABLE 1

| Comparative Example 1 | | |
| --- | --- | --- |
| Lp | [10⁻⁴ cm/(bar * s)] | 75 ± 2 (n = 55) |
| C(urea) | [ml/min] | 338 ± 4 (n = 6) |
| C(vitamin B12) | [ml/min] | 211 ± 2 (n = 6) |
| SC(Myoglobin) (30') | [%] | 88 ± 3 (n = 4) |
| SC(Albumin) (30') | [%] | 9 ± 2 (n = 4) |
| UF ($Q_B$ = 300, TMP = 300) | [ml/min] | 138 ± 6 (n = 4) |
| Pct ($Q_B$ = 300, TMP = 300) | [g/l] | 0.20 ± 0.06 (n = 4) |

Comparative Example 2

A polymer solution was prepared by dissolving polyethersulfone (Ultrason® E 6020, BASF SE) and polyvinylpyrrolidone (Luvitec® K85, BASF SE) and distilled water in N-methyl-2-pyrrolidone (NMP). The weight fraction of the different components in the polymer spinning solution was: PES:PVP K85:H$_2$O:NMP=14:3:4:79.

A membrane was formed by heating the polymer solution to 50° C. and passing the solution as well as a center fluid consisting of 55 wt % water and 45 wt % NMP through a spinning die. The temperature of the die was 56° C. and of the spinning shaft was 54° C. The hollow fiber membrane was formed at a spinning speed of 50 m/min. The liquid capillary leaving the die was passed into a water bath (ambient temperature). The distance between the die and the precipitation bath was 105 cm.

The hollow fiber membrane was washed by passing it through 5 different water baths. After leaving the fifth water bath, the fibers were fed to an online dryer and dried. The dry hollow fiber membrane had an inner diameter of 190 µm and an outer diameter of 260 µm and a fully asymmetric membrane structure.

The membranes were wound on a winding wheel and filters comprising 12024 fibers and having an effective surface area of 1.69 m² were prepared according to the method described above and steam-sterilized ((22±1) min, (121±1°) C.

The performance of the filters was tested as described above. The results are shown in Table 2.

TABLE 2

| Comparative Example 2 | | |
| --- | --- | --- |
| Lp | [10⁻⁴ cm/(bar * s)] | 60 ± 1 (n = 3) |
| C(urea) | [ml/min] | 296 ± 4 (n = 3) |
| C(vitamin B12) | [ml/min] | 158 ± 0 (n = 3) |
| SC(Myoglobin) (30') | [%] | 86 ± 2 (n = 3) |
| SC(Albumin) (30') | [%] | 8 ± 3 (n = 3) |
| UF ($Q_B$ = 300, TMP = 300) | [ml/min] | 136 ± 2 (n = 2) |
| Pct ($Q_B$ = 300, TMP = 300) | [g/l] | 0.90 ± 0.02 (n = 2) |

As can be seen from the comparison of the results obtained in Comparative Example 1 and Comparative Example 2, the membranes comprising only PVP K85 show lower clearance of urea (12% lower) and vitamin B12 (25% lower) and higher protein loss (450%) than the membranes comprising both PVP K85 and PVP K30.

Comparative Example 3

A polymer solution was prepared by dissolving polyethersulfone (Ultrason® E 6020, BASF SE) and polyvinylpyrrolidone (Luvitec® K30 and K85, BASF SE) and distilled water in N-methyl-2-pyrrolidone (NMP). The weight fraction of the different components in the polymer spinning solution was: PES:PVP K85:PVP K30:H$_2$O:NMP=14:2:5:3:76.

A membrane was formed by heating the polymer solution to 50° C. and passing the solution as well as a center fluid consisting of 54.5 wt % water and 45.5 wt % NMP through a spinning die. The temperature of the die was 55° C. and of the spinning shaft was 53° C. The hollow fiber membrane was formed at a spinning speed of 50 m/min. The liquid capillary leaving the die was passed into a water bath (ambient temperature). The distance between the die and the precipitation bath was 100 cm.

The hollow fiber membrane was washed by passing it through 5 different water baths. After leaving the fifth water bath, the fibers were fed to an online dryer and dried. The dry hollow fiber membrane had an inner diameter of 190 µm and an outer diameter of 260 µm and a fully asymmetric membrane structure.

The membranes were wound on a winding wheel and filters comprising 16896 fibers and having an effective surface area of 2.72 m² were prepared according to the method described above and steam-sterilized ((22±1) min, (121±1°) C.

The performance of the filters was tested as described above. The results are shown in Table 3.

TABLE 3

| Comparative Example 3 | | |
| --- | --- | --- |
| Lp | [10⁻⁴ cm/(bar * s)] | 51 ± 1 (n = 3) |
| C(urea) | [ml/min] | 309 ± 3 (n = 3) |
| C(vitamin B12) | [ml/min] | 227 ± 1 (n = 3) |
| SC(Myoglobin) (30') | [%] | 84 ± 1 (n = 3) |
| SC(Albumin) (30') | [%] | 7 ± 1 (n = 3) |
| UF ($Q_B$ = 400, TMP = 300) | [ml/min] | 202 ± 9 (n = 3) |
| Pct ($Q_B$ = 400, TMP = 300) | [g/l] | 0.24 ± 0.06 (n = 3) |

Comparative Example 4

Comparative Example 3 was repeated, with the temperature of the spinning die being 57° C. and the temperature of the spinning shaft being 55° C.

The performance of the filters was tested as described above. The results are shown in Table 4.

TABLE 4

| Comparative Example 4 | | |
| --- | --- | --- |
| Lp | [10⁻⁴ cm/(bar * s)] | 62 ± 1 (n = 3) |
| C(urea) | [ml/min] | 334 ± 3 (n = 3) |
| C(vitamin B12) | [ml/min] | 247 ± 1 (n = 3) |
| SC(Myoglobin) (30') | [%] | 91 ± 1 (n = 3) |
| SC(Albumin) (30') | [%] | 13 ± 1 (n = 3) |
| UF ($Q_B$ = 400, TMP = 300) | [ml/min] | 201 ± 6 (n = 3) |
| Pct ($Q_B$ = 400, TMP = 300) | [g/l] | 0.36 ± 0.07 (n = 3) |

Example 1

A polymer solution was prepared by dissolving polyethersulfone (Ultrason® E 6020, BASF SE) and polyvinylpyrrolidone (Luvitec® K90HM, BASF SE) and distilled water in N-methyl-2-pyrrolidone (NMP). The weight fraction of the different components in the polymer spinning solution was: PES:PVP K90HM:H$_2$O:NMP=14:3.5:3:79.5.

A membrane was formed by heating the polymer solution to 50° C. and passing the solution as well as a center fluid consisting of 56 wt % water and 44 wt % NMP through a spinning die. The temperature of the die was 55° C. and of the spinning shaft was 52° C. The hollow fiber membrane was formed at a spinning speed of 50 m/min. The liquid capillary leaving the die was passed into a water bath (ambient temperature). The distance between the die and the precipitation bath was 100 cm.

The hollow fiber membrane was washed by passing it through 5 different water baths. After leaving the fifth water bath, the fibers were fed to an online dryer and dried. The dry hollow fiber membrane had an inner diameter of 190 μm and an outer diameter of 260 μm and a fully asymmetric membrane structure.

The membranes were wound on a winding wheel and filters comprising 16896 fibers and having an effective surface area of 2.72 m$^2$ were prepared according to the method described above and steam-sterilized ((22±1) min, (121±1°) C.

The performance of the filters was tested as described above. The results are shown in Table 5.

TABLE 5

| | Example 1 | |
|---|---|---|
| Lp | [10$^{-4}$ cm/(bar * s)] | 35 ± 1 (n = 3) |
| C(urea) | [ml/min] | 320 ± 11 (n = 3) |
| C(vitamin B12) | [ml/min] | 227 ± 6 (n = 3) |
| SC(Myoglobin) (30') | [%] | 75 ± 2 (n = 3) |
| SC(Albumin) (30') | [%] | 2 ± 1 (n = 3) |
| UF (Q$_B$ = 400, TMP = 300) | [ml/min] | 198 ± 3 (n = 3) |
| Pct (Q$_B$ = 400, TMP = 300) | [g/l] | 0.41 ± 0.01 (n = 3) |

Example 2

Example 1 was repeated, with the temperature of the spinning die being 56° C. and the temperature of the spinning shaft being 53° C.

The performance of the filters was tested as described above. The results are shown in Table 6.

TABLE 6

| | Example 2 | |
|---|---|---|
| Lp | [10$^{-4}$ cm/(bar * s)] | 39 ± 1 (n = 3) |
| C(urea) | [ml/min] | 335 ± 5 (n = 3) |
| C(vitamin B12) | [ml/min] | 233 ± 3 (n = 3) |
| SC(Myoglobin) (30') | [%] | 78 ± 3 (n = 3) |
| SC(Albumin) (30') | [%] | 7 ± 5 (n = 3) |
| UF (Q$_B$ = 400, TMP = 300) | [ml/min] | 203 ± 15 (n = 3) |
| Pct (Q$_B$ = 400, TMP = 300) | [g/l] | 0.40 ± 0.04 (n = 3) |

Example 3

A polymer solution was prepared by dissolving polyethersulfone (Ultrason® E 6020, BASF SE) and polyvinylpyrrolidone (Luvitec® K90HM, BASF SE) and distilled water in N-methyl-2-pyrrolidone (NMP). The weight fraction of the different components in the polymer spinning solution was: PES:PVP K90HM:H$_2$O:NMP=14.5:3.5:3:79.

A membrane was formed by heating the polymer solution to 50° C. and passing the solution as well as a center fluid consisting of 56 wt % water and 44 wt % NMP through a spinning die. The temperature of the die was 55° C. and of the spinning shaft was 52° C. The hollow fiber membrane was formed at a spinning speed of 50 m/min. The liquid capillary leaving the die was passed into a water bath (ambient temperature). The distance between the die and the precipitation bath was 100 cm.

The hollow fiber membrane was washed by passing it through 5 different water baths. After leaving the fifth water bath, the fibers were fed to an online dryer and dried. The dry hollow fiber membrane had an inner diameter of 190 μm and an outer diameter of 260 μm and a fully asymmetric membrane structure.

The membranes were wound on a winding wheel and filters comprising 16896 fibers and having an effective surface area of 2.72 m$^2$ were prepared according to the method described above and steam-sterilized ((22±1) min, (121±1°) C.

The performance of the filters was tested as described above. The results are shown in Table 7.

TABLE 7

| | Example 3 | |
|---|---|---|
| Lp | [10$^{-4}$ cm/(bar * s)] | 30 ± 1 (n = 3) |
| C(urea) | [ml/min] | 324 ± 6 (n = 3) |
| C(vitamin B12) | [ml/min] | 222 ± 2 (n = 3) |
| SC(Myoglobin) (30') | [%] | 69 ± 4 (n = 3) |
| SC(Albumin) (30') | [%] | 4 ± 1 (n = 3) |
| UF (Q$_B$ = 400, TMP = 300) | [ml/min] | 193 ± 2 (n = 3) |
| Pct (Q$_B$ = 400, TMP = 300) | [g/l] | 0.25 ± 0.01 (n = 3) |

Example 4

Example 3 was repeated, with the temperature of the spinning die being 57° C. and the temperature of the spinning shaft being 54° C.

The performance of the filters was tested as described above. The results are shown in Table 8.

TABLE 8

| | Example 4 | |
|---|---|---|
| Lp | [10$^{-4}$ cm/(bar * s)] | 38 ± 1 (n = 3) |
| C(urea) | [ml/min] | 324 ± 19 (n = 3) |
| C(vitamin B12) | [ml/min] | 223 ± 9 (n = 3) |
| SC(Myoglobin) (30') | [%] | 81 ± 1 (n = 3) |
| SC(Albumin) (30') | [%] | 6 ± 2 (n = 3) |
| UF (Q$_B$ = 400, TMP = 300) | [ml/min] | 195 ± 3 (n = 3) |
| Pct (Q$_B$ = 400, TMP = 300) | [g/l] | 0.35 ± 0.06 (n = 3) |

Example 5

A polymer solution was prepared by dissolving polyethersulfone (Ultrason® E 6020, BASF SE) and polyvinylpyrrolidone (Luvitec® K90HM, BASF SE) and distilled water in N-methyl-2-pyrrolidone (NMP). The weight fraction of the different components in the polymer spinning solution was: PES:PVP K90HM:H$_2$O:NMP=13.5:3.5:3:80.

A membrane was formed by heating the polymer solution to 50° C. and passing the solution as well as a center fluid consisting of 56 wt % water and 44 wt % NMP through a spinning die. The temperature of the die was 55° C. and of the spinning shaft was 52° C. The hollow fiber membrane was formed at a spinning speed of 50 m/min. The liquid capillary leaving the die was passed into a water bath (ambient temperature). The distance between the die and the precipitation bath was 100 cm.

The hollow fiber membrane was washed by passing it through 5 different water baths. After leaving the fifth water bath, the fibers were fed to an online dryer and dried. The dry hollow fiber membrane had an inner diameter of 190 μm and an outer diameter of 260 μm and a fully asymmetric membrane structure.

The membranes were wound on a winding wheel and filters comprising 16896 fibers and having an effective surface area of 2.72 m² were prepared according to the method described above and steam-sterilized ((22±1) min, (121±1°) C.

The performance of the filters was tested as described above. The results are shown in Table 9.

TABLE 9

| Example 5 | | |
|---|---|---|
| Lp | [10⁻⁴ cm/(bar * s)] | 36 ± 1 (n = 3) |
| C(urea) | [ml/min] | 301 ± 11 (n = 3) |
| C(vitamin B12) | [ml/min] | 218 ± 5 (n = 3) |
| SC(Myoglobin) (30') | [%] | 73 ± 1 (n = 3) |
| SC(Albumin) (30') | [%] | 6 ± 1 (n = 3) |
| UF ($Q_B$ = 400, TMP = 300) | [ml/min] | 208 ± 14 (n = 3) |
| Pct ($Q_B$ = 400, TMP = 300) | [g/l] | 0.38 ± 0.07 (n = 3) |

Example 6

A polymer solution was prepared by dissolving polyethersulfone (Ultrason® E 6020, BASF SE) and polyvinylpyrrolidone (Luvitec® K90HM, BASF SE) and distilled water in N-methyl-2-pyrrolidone (NMP). The weight fraction of the different components in the polymer spinning solution was: PES:PVP K90HM:H₂O:NMP=14:4:3:79.

A membrane was formed by heating the polymer solution to 50° C. and passing the solution as well as a center fluid consisting of 56 wt % water and 44 wt % NMP through a spinning die. The temperature of the die was 57° C. and of the spinning shaft was 54° C. The hollow fiber membrane was formed at a spinning speed of 50 m/min. The liquid capillary leaving the die was passed into a water bath (ambient temperature). The distance between the die and the precipitation bath was 100 cm.

The hollow fiber membrane was washed by passing it through 5 different water baths. After leaving the fifth water bath, the fibers were fed to an online dryer and dried. The dry hollow fiber membrane had an inner diameter of 190 μm and an outer diameter of 260 μm and a fully asymmetric membrane structure.

The membranes were wound on a winding wheel and filters comprising 16896 fibers and having an effective surface area of 2.72 m² were prepared according to the method described above and steam-sterilized ((22±1) min, (121±1°) C.

The performance of the filters was tested as described above. The results are shown in Table 10.

TABLE 10

| Example 6 | | |
|---|---|---|
| Lp | [10⁻⁴ cm/(bar * s)] | 35 ± 3 (n = 3) |
| C(urea) | [ml/min] | 307 ± 5 (n = 3) |
| C(vitamin B12) | [ml/min] | 221 ± 3 (n = 3) |
| SC(Myoglobin) (30') | [%] | 72 ± 2 (n = 3) |
| SC(Albumin) (30') | [%] | 11 ± 3 (n = 3) |
| UF ($Q_B$ = 400, TMP = 300) | [ml/min] | 203 ± 12 (n = 3) |
| Pct ($Q_B$ = 400, TMP = 300) | [g/l] | 0.61 ± 0.12 (n = 3) |

Example 7

Example 6 was repeated, with the temperature of the spinning die being 58° C. and the temperature of the spinning shaft being 55° C.

The performance of the filters was tested as described above. The results are shown in Table 11.

TABLE 11

| Example 7 | | |
|---|---|---|
| Lp | [10⁻⁴ cm/(bar * s)] | 37 ± 1 (n = 3) |
| C(urea) | [ml/min] | 304 ± 21 (n = 3) |
| C(vitamin B12) | [ml/min] | 219 ± 12 (n = 3) |
| SC(Myoglobin) (30') | [%] | 79 ± 2 (n = 3) |
| SC(Albumin) (30') | [%] | 14 ± 6 (n = 3) |
| UF ($Q_B$ = 400, TMP = 300) | [ml/min] | 190 ± 3 (n = 3) |
| Pct ($Q_B$ = 400, TMP = 300) | [g/l] | 0.63 ± 0.07 (n = 3) |

The invention claimed is:

1. A semipermeable asymmetric membrane, wherein the membrane material comprises at least one polysulfone, poly-ethersulfone, or polyarylethersulfone; and a polyvinylpyrrolidone, wherein the polyvinylpyrrolidone consists essentially of a polyvinylpyrrolidone with a weight average molecular weight Mw of more than 1,700 kDa and less than 1,900 kDa and with a number average molecular weight Mn between about 340 kDa to about 390 kDa.

2. The semipermeable asymmetric membrane of claim 1, wherein the polyvinylpyrrolidone has a number average molecular weight Mn in the range of from 360 to 390 kDa.

3. The semipermeable asymmetric membrane of claim 2, wherein the polydispersity Mw/Mn of the polyvinylpyrrolidone is in the range of from 4.5 to 5.4.

4. The semipermeable asymmetric membrane of claim 1, wherein the semipermeable asymmetric membrane is a flat sheet membrane.

5. The semipermeable asymmetric membrane of claim 1, wherein the semipermeable asymmetric membrane is a hollow fiber membrane.

6. The semipermeable asymmetric membrane of claim 5, wherein the semipermeable asymmetric membrane is a four-layer structure.

7. A process for preparing a semipermeable asymmetric hollow fiber membrane, comprising:
   a) dissolving i) at least one polysulfone, poly-ethersulfone, or polyarylethersulfone and ii) a polyvinylpyrrolidone in at least one solvent to form a polymer solution;
   b) extruding the polymer solution through an outer ring slit of a nozzle with two concentric openings into a precipitation bath;
   c) extruding a center fluid through the inner opening of the nozzle; and thereafter
   d) washing the resultant membrane;
   e) drying the membrane; and
   f) optionally, sterilizing the membrane wherein the polyvinylpyrrolidone consists essentially of a polyvinylpyrrolidone with a weight average molecular weight Mw of more than 1,700 kDa and less than 1,900 kDa and with a number average molecular weight Mn between about 340 kDa to about 390 kDa.

8. The process of claim 7, wherein the concentration of polysulfone, polyethersulfone, or polyarylethersulfone in the polymer solution is in the range of from 12 to 16 wt %, relative to the total weight of the polymer solution; and the concentration of polyvinylpyrrolidone in the polymer solution is in the range of from 1.5 to 5 wt %, relative to the total weight of the polymer solution.

9. The process of claim 8, wherein the polymer solution comprises water from 1 to 5 wt %, relative to the total weight of the polymer solution.

10. The process of claim 7, wherein the solvent is selected from the group consisting of N-methyl2-pyrrolidone, N-ethyl-2-pyrrolidone, N-octyl-2-pyrrolidone, dimethylacetamide, dimethylsulfoxide, dimethylformamide, butyrolactone, and mixtures thereof.

11. The process of claim 10, wherein the solvent is N-methyl-2-pyrrolidone.

12. The process of claim 7, wherein the center fluid comprises i) water from 50 to 60 wt %, relative to the total weight of the center fluid; and ii) N-methyl-2-pyrrolidone from 40 to 50 wt %, relative to the total weight of the center fluid.

13. The process of claim 7, wherein the spinning nozzle is held at a temperature within the range of from 50 to 60° C.

14. A diffusion or filtration device comprising a semipermeable asymmetric membrane, wherein the membrane material comprises at least one polysulfone, poly-ethersulfone, or polyarylethersulfone; and a polyvinylpyrrolidone, wherein the polyvinylpyrrolidone consists essentially of a polyvinylpyrrolidone with a weight average molecular weight Mw of more than 1,700 kDa and less than 1,900 kDa and with a number average molecular weight Mn between about 340 kDa to about 390 kDa.

15. The diffusion or filtration device of claim 14, wherein the polyvinylpyrrolidone has a number average molecular weight Mn in the range of from 360 to 390 kDa.

16. The diffusion or filtration device of claim 14, wherein the polydispersity Mw/Mn of the polyvinylpyrrolidone is in the range of from 4.5 to 5.4.

17. The diffusion or filtration device of claim 14, wherein the semipermeable asymmetric membrane is a flat sheet membrane.

18. The diffusion or filtration device of claim 14, wherein the semipermeable asymmetric membrane is a hollow fiber membrane.

19. The diffusion or filtration device of claim 18, wherein the semipermeable asymmetric membrane is a four-layer structure.

* * * * *